United States Patent [19]

Kaneko

[11] Patent Number: 4,817,161

[45] Date of Patent: Mar. 28, 1989

[54] VARIABLE SPEED SPEECH SYNTHESIS BY INTERPOLATION BETWEEN FAST AND SLOW SPEECH DATA

[75] Inventor: Hiroshi Kaneko, Tokyo, Japan

[73] Assignee: International Business Machines Corporation, Armonk, N.Y.

[21] Appl. No.: 27,711

[22] Filed: Mar. 19, 1987

[30] Foreign Application Priority Data

Mar. 25, 1986 [JP] Japan .......................... 61-65029

[51] Int. Cl.[4] .......................... G01L 1/00

[52] U.S. Cl. .......................... 381/51; 364/513.5

[58] Field of Search .......................... 381/36-40, 381/51-53; 364/513.5

[56] References Cited

U.S. PATENT DOCUMENTS 2,575,910 11/1951 Mathes .......................... 381/43

4,470,150 9/1984 Ostrowski .......................... 364/513.5

*Primary Examiner*—Bernard Roskoski

*Attorney, Agent, or Firm*—Marc A. Block; Marc D. Schechter

[57] ABSTRACT

The present invention relates to apparatus and method of synthesizing speech for synthesis units which form words. The method comprises the steps of generating, for each of multiple utterances of a given synthesis unit, a series of frames of analysis data, the frames being generated one frame every To period, each frame in each series having a parameter value associated therewith; where one series results in M frames of data, partitioning each other series of frames to provide M time intervals each of which corresponds to one of the frames of said one series; synthesizing speech data for the synthesis unit, the synthesized speech data corresponding to a sequence of time intervals wherein each time interval has an associated parameter value, said synthesizing step including the steps of:

(a) representing the synthesized data as a sequence of M time intervals, interpolating each ith time interval (where 1≦i≦M) for the synthesized data from the respective ith intervals corresponding to the utterance; and (b) interpolating the parameter value at each ith time interval of the synthesized data from the parameter values for the respective ith intervals corresponding to the utterances.

22 Claims, 8 Drawing Sheets

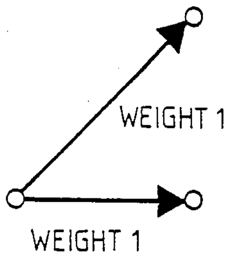
FIG. 5
| FRAME NO. | | 1 | 2 | 3 | ... | M |
|---|---|---|---|---|---|---|
| PERIOD LENGTH VARIATION | $\Delta T_i$ | $\Delta T_1$ | $\Delta T_2$ | $\Delta T_3$ | | $\Delta T_M$ |
| SYNTHESIS PARAMETERS | $p_i$ | $p_1$ | $p_2$ | $p_3$ | | $p_M$ |
| PARAMETER VARIATION | $\Delta p_i$ | $\Delta p_1$ | $\Delta p_2$ | $\Delta p_3$ | | $\Delta p_M$ |
FIG. 7
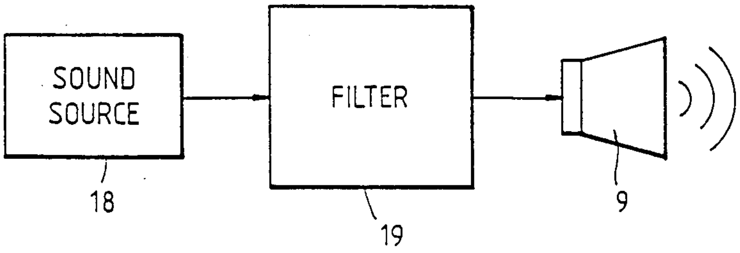
FIG. 8

VARIABLE SPEED SPEECH SYNTHESIS BY INTERPOLATION BETWEEN FAST AND SLOW SPEECH DATA

FIELD OF THE INVENTION

The present invention generally relates to speech synthesis and, more particularly, to a speech synthesis process and system wherein the durations of speeches may be varied conveniently with the quality of their phonetic characteristics maintained high.

PRIOR ART

The speaking speed or duration of natural speech may vary due to various factors. For example, the duration of a spoken sentence as a whole may be extended or reduced according to speaking tempo. Also, the durations of certain phrases and words may be locally extended or reduced according to linguistic constraints such as structures, meanings and contents, etc., of sentences. Further, the durations of syllables may be extended or reduced according to the number of syllables spoken in one breathing interval. Therefore, it is necessary to control the durations of speeches in order to obtain synthesized speech of high quality, namely similar to natural speech.

In the prior art, there have been proposed two techniques for controlling the duration of speech. In one of the techniques, synthesis parameters in certain portions are removed or repeated while, in the other, periods of synthesis frames are varied. (Periods of analysis frames are fixed). These techniques are described in Japanese Published Unexamined Patent Application No. 50-62,709, for example. The above-mentioned technique of removing and repeating synthesis parameters requires the finding of contant vowel portions by inspection and setting them as variable portions beforehand, thus requiring complicated operations. Further, as the duration of a speech varies, the phonetic characteristics also changes since the dynamic features of articulatory organs transform. For example, the formants of vowels are generally neutralized as the duration of a speech is reduced. In the first noted prior technique, it is impossible to reflect such changes in synthesized speeches.

In the other prior technique of varying the periods of synthesis frames, all the portions of a speech are extended or reduced uniformly. Since ordinary speeches comprise portions which are individually extended or reduced remarkably or slightly, such a prior technique would generate quite unnaturally synthesized speeches. Of course, this prior technique cannot reflect the above-stated changes of the phonetic characteristics in synthesized speeches.

SUMMARY OF THE INVENTION

As a consequence of the foregoing difficulties in the prior art, it is an object of the present invention to provide a speech synthesis process and system wherein the durations of synthesis units (e.g., phonemes, syllables, words, etc.) for speech synthesis may be varied conveniently with the quality of their phonetic characteristics being maintained high.

In order to accomplish the above object, in the present invention, a plurality of speeches extending over different durations obtaine for a synthesis unit are analyzed, respectively, and a plurality of resultant analysis data are interpolated to be used for speech synthesis.

More specifically, a speech to be synthesized, extending over a target duration, comprises a plurality of variable period-length frames, each corresponding, one-to-one, to frames of a first set of basic analysis data (referring to as first data portions). Also, the frames of the first basic analysis data (the first data portions) and frames of a second basic analysis data (second data portions) are matched based on their acoustic characteristics. That is, each of the variable period-length frames of the speech to be synthesized is matched wiht a predetermined portion of the first basic analysis data (a first data portion) and a predetermined portion of the second basic analysis data (a second data portion). The period lengths of the varible period-length frames of the speech to be synthesized are determined buy interpolating the period lengths of the corresponding portions of the first and second basic analysis data. The synthesis parameters of the variable period-length frames of the speech to be synthesized are determined by interpolating the synthesis parameters of the corresponding portions of the first and second basic analysis data.

Additional sets of analysis data may be employed to correct the period lengths and synthesis parameters of the variable period length frames of the speech to be synthesized.

Further, a synthesized speech of higher quality can be obtained by analyzing a speech spoken at a standard speed to obtain the origin for interpolation, which is either the first or second basic analysis data.

It is possible to match the first basic analysis data with the second basic analysis data with relatively few calculations by employing a dynamic programming.

BRIEF DESCRIPTION OF THE DRAWINGS

FIGS. 3 through 8 show diagrams for explaining the processing illustrated in FIG. 2.

DESCRIPTION OF PREFERRED EMBODIMENTS

Figure 1:
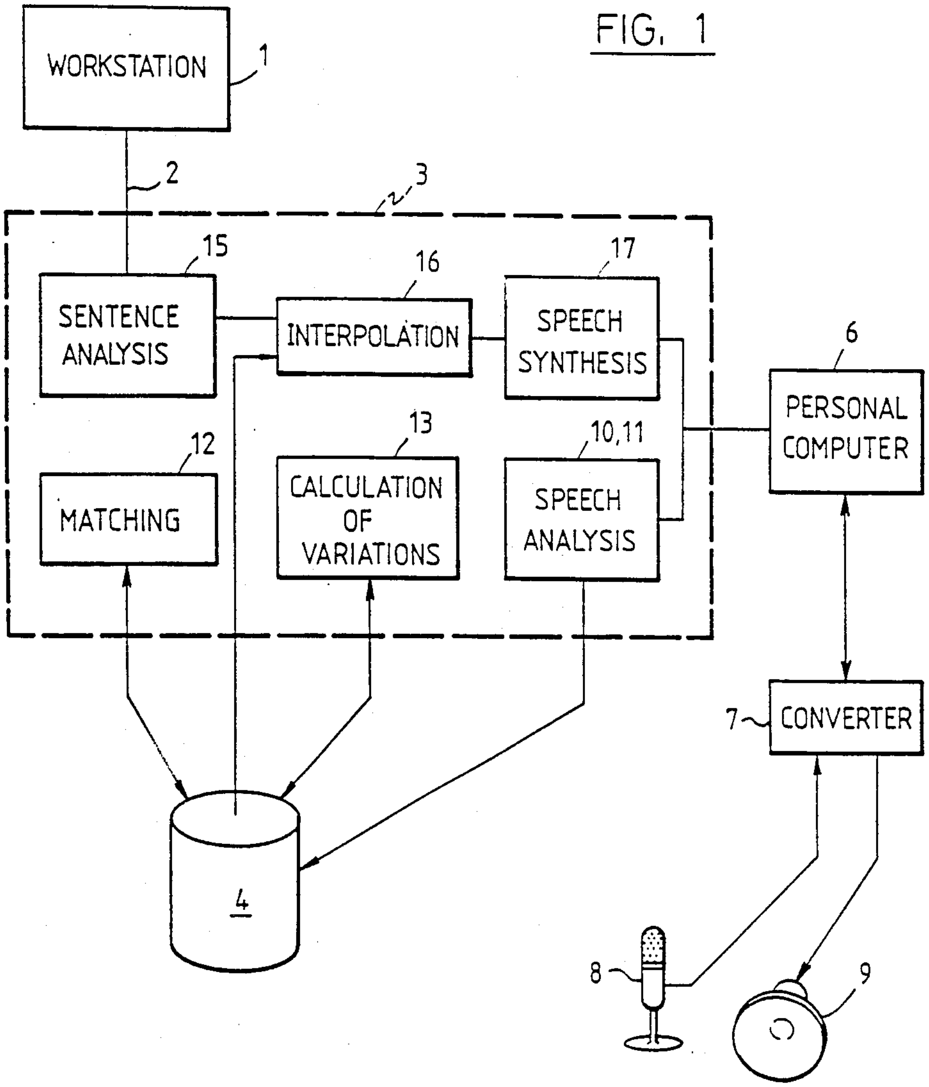
FIG. 1 shows a block diagram illustrating a system for executing a first embodiment of the present invention, as a whole.

Referring now to the drawings, the present invention will be explained more in detail with reference to an embodiment thereof applied to the Japanese text-to-speech synthesis by rules. The text-to-speech synthesis performs an automaitc speech synthesis from any input text and generally includes four stages of (1) inputting a text, (2) analyzing a sentence, (3) synthesizing a speech, and (4) outputting the speech. In stage (2), phonetic data and prosodic data are determined with reference to a Kanji-Kana conversion dictionary and a prosodic rule dictionary. In stage (3), snythesis parameters are sequentially read out with reference to a parameter file. In this embodiment, wherein one synthesized speech is generated from two input speeches, as will be stated later, a composite parameter file is employed. This will be described later in more detail.

As synthesis units for speech synthesis, 101 Japanese syllables are used.

Figure 2:
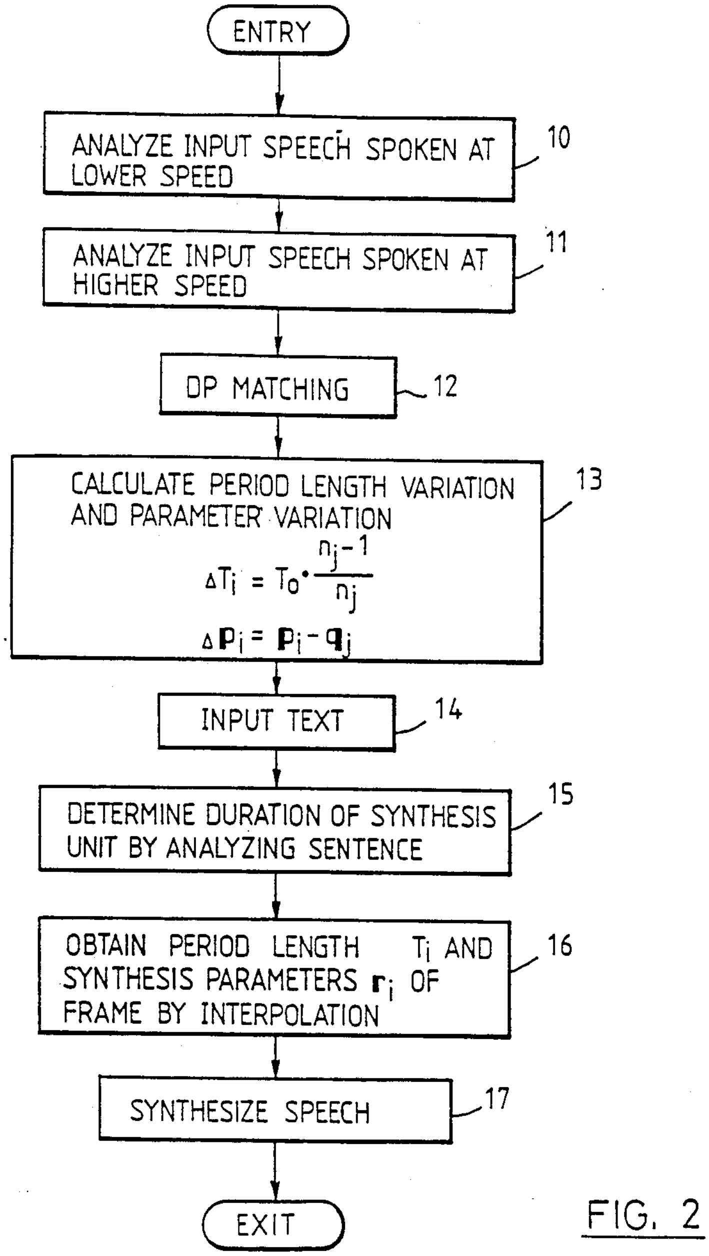
FIG. 2 shows a flow chart for explaining the processing performed by the system in FIG. 1.

FIG. 1 illustrates a system for realizing an embodiment of the process of the present invention, as a whole. In FIG. 1, a workstation 1 for inputting a Japanese text can perform Japanese processings such as Kanji-Kana conversions. The workstation 1 is connected through a line 2 to a host computer 3 to which auxiliary storage 4 is connected. Most of the procedures in this embodiment, which can be realized with software executed by the host computer 3, are illustrated in blocks indicating the functions performed. The functions in these blocks are detailed in FIG. 2. In the blocks of FIGS. 1 and 2, like portions are illustrated with like numbers.

Further, to the host computer 3, a personal computer 6 is connected through a line 5. An A/D-D/A converter 7 is connected to the personal computer 6. To the converter 7, a microphone 8 and a speaker 9 are connected. The personal computer 6 executes routines for driving the A/D conversions and D/A conversions.

In the above configuration, when a speech is input into the microphone 8, the input speech is A/D converted, under the control of the personal computer 6, and then supplied to the host computer 3. A speech analysis function 10, 11 in the host computer 3 analysis digitized speech data for each of a plurality of analysis frame periods $T_0$; generates synthesis parameters; and stores them into the storage 4. This is shown with lines $l_1$ and $l_2$ in FIG. 3. With respect to the lines $l_1$ and $l_2$, the analysis frame periods are shown as $T_0$ and the synthesis parameters are shown as $P_i$ and $q_j$. In this embodiment, line spectrum pair parameters are employed as synthesis parameters, although formant parameters, PARCOR coefficients, and so on may also be employed.

Figure 3:
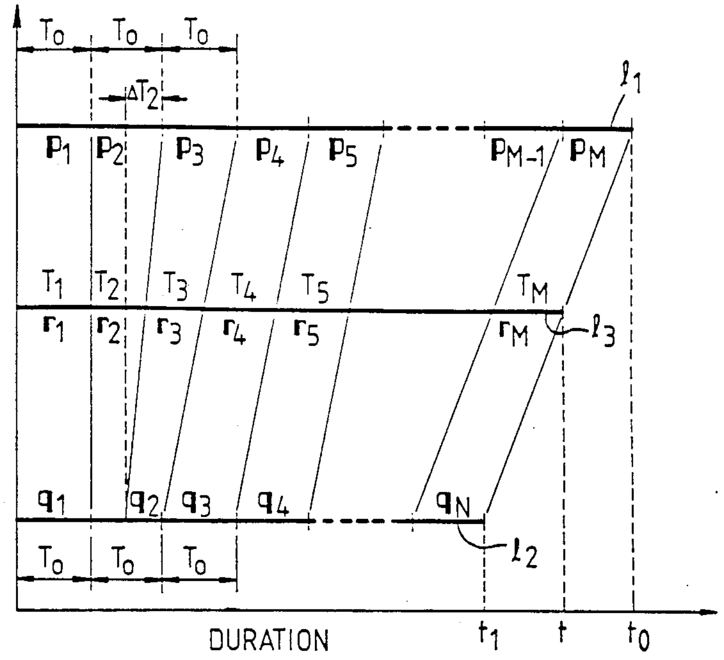

A parameter train for a speech to be synthesized is shown with a line $l_3$ in FIG. 3. The period lengths $T_1$-$T_m$ of M synthesis frames shown are variables and the synthesis parameters are shown as $r_i$. The parameter train will be explained later more in detail. The synthesis parameters of the parameter train are sequentially supplied to a speech synthesis function 17 in the host computer 3 and digital speech data representing the speech to be synthesized is supplied to the converter 7 through the personal computer 6. The converter 7 converts the digital speech data to analogue speech data under the control of the personal computer 6 to generate a synthesized speech through the speaker 9. FIG. 2 illustrates the steps of this embodiment as a whole. In FIG. 2, a parameter file is first established. Namely, a speech obtained by speaking one of the synthesis units (e.g. one of the 101 Japanese syllables) at a low speed is analyzed (Step 10). The resultant analysis data comprises M consecutive frames, each having the frame period $T_0$, for example, as shown with the line $l_1$ in FIG. 3. The duration $t_0$ of the analysis data for the synthesis unit is $(M \times T_0)$. Next, a speech obtained by speaking the same synthesis unit at a higher speed is analyzed (Step 11). The resultant analysis data comprises N consecutive frames, each having the frame period $T_0$, for example, as shown with the line $l_2$ in FIG. 3. The duration $t_1$ of the analysis data for the synthesis unit is $(N \times T_0)$. Then, the analysis data in the line $l_1$ and $l_2$ are matched by Dynamic Programming (DP) matching (Step 12).

Figure 4:
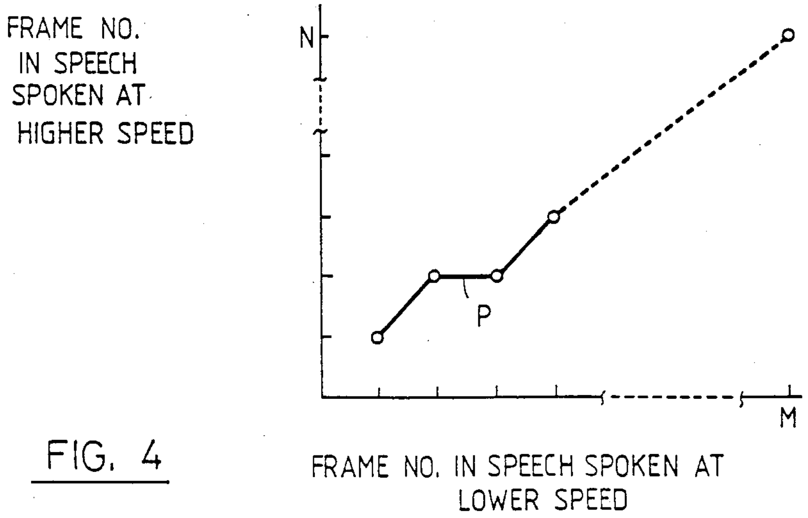

As illustrated in FIG. 4, a path P which has the smallest cumulative distance between the frames is obtained by the DP matching, and the frames in the lines $l_1$ and $l_2$ are matched in accordance with the path P. In practice, the DP matching can move only in two directions, as illustrated in FIG. 5. Since one of the frames in the speech spoken at the lower speed should not correspond to more than one of the frames in the speech spoken at the higher speed, such a matching is prohibited by the rules illustrated in FIG. 5.

Thus, similar frames have been matched between the lines $l_1$ and $l_2$, as illustrated in FIG. 3. Namely, $p_1 \longleftrightarrow q_1$, $p_2 \longleftrightarrow q_2$, $p_3 \longleftrightarrow q_2$ . . . have been matched as similar frames. A plurality of frames in the line $l_1$ may correspond to one frame in the line $l_2$. In such a case, the frame in the line $l_2$ is equally divided into portions and each of said portions is deemed to correspond to each of said plurality of frames in the line $l_1$. For example, in FIG. 3, the second frame and the third frame in the line $l_1$ correspond to respective half portions of the second frame in the line $l_2$. As a result, the M frames in the line $l_1$ correspond to M period portions in the line $l_2$, respectively. It is apparent that these period portions do not always have the same period lengths.

The speech to be synthesized, extending over a duration t between the durations $t_0$ and $t_1$, is shown with the line $l_3$ in FIG. 3. This speech to be synthesized comprises M frames, each corresponding to one frame in the line $l_1$ and to one period portion in the line $l_2$. Accordingly, each of the frames in the speech to be synthesized has a period length interpolated between the period length of the corresponding one frame in the line $l_1$, i.e., $T_0$, and the period length of the corresponding one period portion in the line $l_2$. The synthesis parameters $r_i$ of each of the frames are parameters interpolated between the corresponding synthesis parameters $p_i$ and $q_i$.

After the DP matching, a period length variation $\Delta T_i$ and a parameter variation $\Delta p_i$ of each of the frames are obtained (Step 13). The period length variation $\Delta T_i$ indicates a variation from the period length of the "i"th frame in the line $l_1$, (i.e., $T_0$, to the period length of the period portion in the line $l_2$ corresponding to the "6"th frame in the line $l_1$. In FIG. 3, $\Delta T_2$ is shown as an example thereof. When the frame in the line $l_2$ corresponding to the "i"th frame in the line $l_1$ is denoted as the "j"th frame in the line $l_2$, $\Delta T_i$ may be expressed as $$\Delta T_i = T_0 \frac{n_j - 1}{n_j}$$

where $n_j$ denotes the number of frames in the line $l_1$ corresponding to the "j"th frame in the line $l_2$.

When the duration t of the speech to be synthesized is expressed by linear interpolation between $t_0$ and $t_1$, with $t_0$ selected as the origin for interpolation, the following expression may be obtained.

$$t = t_0 + x(t_1 = t_0)$$

where $0 \leqq x \leqq 1$. The x in the above expression is hereinafter referred to as an interpolation variable. As the interpolation variable approaches 0, the duration t approaches the origin for interpolation. Expressed in terms of the interpolation variable x and the variation $\Delta T_i$, the period length $T_i$ of each of the frames in the speech to be synthesized is interpolated as:

$$T_i = T_0 - x\,\Delta T_i$$

Where $T_0$ is a frame period selected as the origin for interpolation. Thus, by obtaining $\Delta T_i$, the period length $T_i$ of each of the frames in a speech to be synthesized, extending over any duration between $t_i$ through $t_0$ can be obtained.

On the other hand, the parameter variation $\Delta p_i$ is $(p_i - q_j)$ and the synthesis parameters $r_i$ of each of the frames in the speech to be synthesized may be obtained by the following expression.

$$r_i = p_i - x\,\Delta p_i$$

Accordingly, by obtaining $\Delta p_i$, the synthesis parameters $r_i$ of each of the frames in a speech to be synthesized, extending over any duration of length between $t_1$ through $t_0$, can be obtained.

The variations $\Delta T_i$ and $\Delta p_i$ thus obtained are stored into the auxiliary storage 4 together with $p_i$ with a format such as illustrated in FIG. 7. The above processing is performed for each of the synthesis units for speech synthesis in order to form a composite parameter file.

With the parameter file formed, the text-to-speech synthesis is ready to be started, and a text is input (Step 14). The text is input at the work-station 1 and the text data is transferred to the host computer 3, as stated before. A sentence analysis function 15 in the host computer 3 performs Kanji-Kana conversions, determinations of prosodic parameters, and determinations of durations of synthesis units. This is illustrated in the following Table 1 showing the flow chart of the function and a specific example thereof. In this example, the duration of each of a number of phonemes (consonants and vowels) is firat obtained and then the duration of a syllable, i.e., a synthesis unit, is obtained by summing up all the durations of the phonemes.

TABLE 1

Flow Chart and Example of Sentence Analysis Function

| Flow | Example |
|---|---|
| Input a sentence. | |
| ↓ | 私は、言葉をしゃべる機械です。 |
| Divide into phrases. | |
| ↓ | 私は、\| 言葉を \| しゃべる \| 機械です。 |
| Determine pronunciation and accent of each phrase. | WA/TASHI WA \| KO/TOBA\O \| |
| ↓ | |
| Determine breathing intervals. | WA/TASHI WA \| KO/TOBA\O |
| ↓ | |
| | SHA/BE\RU |
| Determine pitch frequencies considering breathing interval and accent. | |
| ↓ | |

TABLE 1-continued

Flow Chart and Example of Sentence Analysis Function

| Flow | Example | | | |
|---|---|---|---|---|
| Allocate duration to each phoneme according to duration specific to the phoneme and speaking speed (specified by user). | W | 90 ms | | |
| | A | 100 ms | | |
| | T | 110 ms | | |
| | A | 100 ms | | |
| | SH | 120 ms | | |
| | I | 90 ms | | |
| | . | . | | |
| ↓ | | | | |
| Control duration of each phoneme considering extension and reduction due to the number of syllables in a breathing interval, extension and reduction of the first and last syllables in a breathing interval, and influence of adjacent syllables. | W | 85 ms | | |
| | A | 87 ms | | |
| | T | 110 ms | | |
| | A | 83 ms | | |
| | SH | 120 ms | | |
| | I | 81 ms | | |
| | . | . | | |
| ↓ | | | | |
| Calculate duration of each synthesis unit | W | 85 ms | → WA | 172 ms |
| | A | 87 ms | | |
| | T | 110 ms | → TA | 193 ms |
| | A | 83 ms | | |
| | SH | 120 ms | → SHI | 201 ms |
| | I | 81 ms | | |

Figure 6:
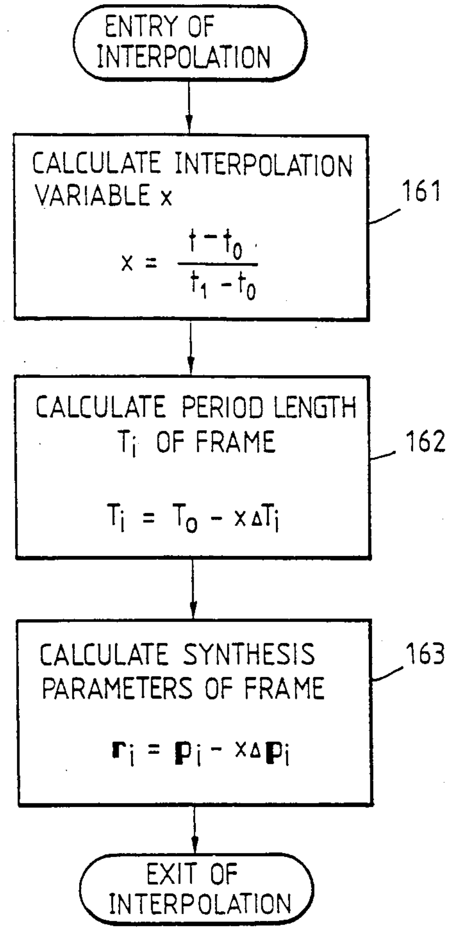

Thus, with the duration of each of the synthesis units in the text obtained by the sentence analysis function, the period length and synthesis parameters of each of the frames are next to be interpolated for each of the synthesis units (Step 16), as illustrated in detail in FIG. 6. Namely, an interpolation variable x is first obtained. Since $t = t_0 + x\,(t_1 - t_0)$, the following expression is obtained (Step 161).

$$x = \frac{t - t_0}{t_1 - t_0}$$

From the above expression, it can be seen to what extent each of the synthesis units is near to the origin for interpolation. Next, the period length $T_i$ and the synthesis parameter $r_i$ of each of the frames in each of the synthesis units are obtained from the following expressions, respectively, with reference to the parameter file (Step 162 and 163).

$$T_i = T_0 - x\,\Delta T_i$$

$$r_i = p_i - x\,\Delta p_i$$

Thereafter, a speech is synthesized based on the period length $T_i$ and the synthesis parameters $r_i$ (Step 17 in FIG. 2). The speech synthesis function is represented schematically in FIG. 8. Namely, a speech model is considered to include a sound source 18 and a filter 19. Signals indicating whether a sound is voiced (pulse train) or unvoiced (white noise) (indicated with U and V, respectively) are supplied as sound source control data, and line spectrum pair parameters, etc., are supplied as filter control data.

As a result of the above processing, speeches of a text, for example "私は、言葉を・・・" shown in Table 1, are synthesized and spoken through the speaker 9.

The following Tables 2 through 5 show, as an example, the processing of the syllable "WA" extending over a duration of 172 ms. Namely, Table 2 shows the analysis of the speech of the syllable "WA" having the analysis frame period of 10 ms and extending over the duration of 200 ms (a speech spoken at a lower speed), and Table 3 shows the analysis of the speech of the syllable "WA" having the same frame period and extending over the duration of 150 ms (a speech spoken at a higher speed). Table 4 shows the correspondence between these speeches by DP mathcing. A portion of the parameter file for the syllable "WA" prepared according to Tables 2 through 4 is shown in Table 5. (The line spectrum parameters.). Table 5 shows also the period length and synthesis parameters (the first parameters) of each of the frames in the speech of the syllable "WA" extending over the duration of 172 ms.

TABLE 2

Synthesis Parameters for Speech of [WA] Spoken at Lower Speed

| Frame | Sound Source Control Data | | Line Spectrum Pair (Hz) | | | | | | | | | |
|---|---|---|---|---|---|---|---|---|---|---|---|---|
| No. | V/U | Amplitude | 1 | 2 | 3 | 4 | 5 | 6 | 7 | 8 | 9 | 10 |
| 1 | V | 4 | 350 | 431 | 587 | 835 | 2301 | 2613 | 2939 | 3215 | 3676 | 4400 |
| 2 | V | 24 | 353 | 431 | 591 | 859 | 2222 | 2635 | 2947 | 3228 | 3831 | 4461 |
| 3 | V | 54 | 360 | 436 | 601 | 897 | 2213 | 2612 | 2937 | 3233 | 3852 | 4404 |
| 4 | V | 47 | 373 | 431 | 613 | 784 | 2334 | 2605 | 2907 | 3184 | 3686 | 4321 |
| 5 | V | 59 | 394 | 447 | 669 | 762 | 2413 | 2608 | 2922 | 3202 | 3592 | 4390 |
| 6 | V | 84 | 417 | 501 | 710 | 780 | 2396 | 2602 | 2916 | 3214 | 3594 | 4362 |
| 7 | V | 110 | 466 | 586 | 746 | 846 | 2359 | 2581 | 2888 | 3226 | 3528 | 4217 |
| 8 | V | 170 | 537 | 621 | 839 | 974 | 2388 | 2579 | 2904 | 3281 | 3522 | 4265 |
| 9 | V | 229 | 578 | 656 | 933 | 1032 | 2352 | 2566 | 2836 | 3367 | 3530 | 4197 |
| 10 | V | 262 | 601 | 691 | 988 | 1061 | 2336 | 2544 | 2797 | 3419 | 3546 | 4049 |
| 11 | V | 302 | 621 | 729 | 1038 | 1125 | 2334 | 2542 | 2833 | 3467 | 3574 | 4145 |
| 12 | V | 325 | 542 | 755 | 1071 | 1176 | 2365 | 2549 | 2897 | 3506 | 3603 | 4194 |
| 13 | V | 337 | 668 | 781 | 1057 | 1236 | 2354 | 2548 | 2787 | 3512 | 3579 | 4326 |
| 14 | V | 367 | 701 | 805 | 1047 | 1286 | 2359 | 2546 | 2819 | 3508 | 3643 | 4566 |
| 15 | V | 425 | 727 | 823 | 1096 | 1276 | 2363 | 2555 | 2911 | 3518 | 3783 | 4588 |
| 16 | V | 389 | 737 | 818 | 1150 | 1274 | 2359 | 2539 | 2914 | 3529 | 3967 | 4586 |
| 17 | V | 269 | 757 | 806 | 1185 | 1268 | 2323 | 2524 | 2828 | 3529 | 3943 | 4671 |
| 18 | V | 74 | 766 | 801 | 1205 | 1258 | 2290 | 2510 | 2741 | 3484 | 4028 | 4750 |
| 19 | V | 34 | 738 | 792 | 1106 | 1251 | 2185 | 2613 | 3036 | 3631 | 3823 | 4662 |
| 20 | V | 16 | 759 | 818 | 1160 | 1745 | 2535 | 2677 | 3394 | 3640 | 3905 | 4432 |

TABLE 3

Synthesis Parameters for Speech of [WA] Spoken at Higher Speed

| Frame | Sound Source Control Data | | Line Spectrum Pair (Hz) | | | | | | | | | |
|---|---|---|---|---|---|---|---|---|---|---|---|---|
| No. | V/U | Amplitude | 1 | 2 | 3 | 4 | 5 | 6 | 7 | 8 | 9 | 10 |
| 1 | V | 3 | 299 | 394 | 557 | 611 | 2369 | 2640 | 2943 | 3245 | 3699 | 4541 |
| 2 | V | 30 | 277 | 343 | 590 | 657 | 2265 | 2603 | 2882 | 3083 | 3706 | 4500 |
| 3 | V | 55 | 231 | 317 | 557 | 667 | 2222 | 2665 | 2878 | 3163 | 3974 | 4206 |
| 4 | V | 42 | 222 | 267 | 600 | 662 | 2401 | 2523 | 2760 | 2953 | 3747 | 4333 |
| 5 | V | 79 | 271 | 275 | 696 | 794 | 2320 | 2519 | 2743 | 3084 | 3669 | 4283 |
| 6 | V | 105 | 362 | 454 | 806 | 843 | 2333 | 2565 | 2867 | 3025 | 3593 | 4502 |
| 7 | V | 219 | 524 | 587 | 897 | 920 | 2383 | 2473 | 2823 | 3227 | 3405 | 4530 |
| 8 | V | 245 | 542 | 606 | 920 | 994 | 2375 | 2600 | 2694 | 3350 | 3611 | 4366 |
| 9 | V | 309 | 589 | 682 | 1032 | 1100 | 2341 | 2581 | 2915 | 3606 | 3671 | 4496 |
| 10 | V | 317 | 649 | 736 | 974 | 1232 | 2330 | 2570 | 2903 | 3550 | 3613 | 4744 |
| 11 | V | 356 | 685 | 759 | 1148 | 1217 | 2330 | 2453 | 3064 | 3613 | 4158 | 4717 |
| 12 | V | 220 | 726 | 761 | 1157 | 1219 | 2299 | 2410 | 2835 | 3534 | 3959 | 4810 |
| 13 | V | 84 | 737 | 751 | 1236 | 1246 | 2302 | 2434 | 2786 | 3584 | 4044 | 4821 |
| 14 | V | 24 | 706 | 777 | 1056 | 1200 | 2065 | 2579 | 2954 | 3777 | 3813 | 4826 |
| 15 | V | 9 | 735 | 759 | 1100 | 1959 | 2523 | 2716 | 3685 | 3803 | 4119 | 4842 |

TABLE 4

DP Matching Result (Frame No.)

| | | | | | | | | | | | | | | | | | | | | |
|---|---|---|---|---|---|---|---|---|---|---|---|---|---|---|---|---|---|---|---|---|
| Speech Spoken at Higher Speed | 1 | 2 | 3 | 4 | 5 | 6 | 7 | 8 | 9 | 10 | 11 | 12 | 13 | 14 | 15 | 16 | 17 | 18 | 19 | 20 |
| Speech Spoken at Lower Speed | 1 | 2 | 3 | 4 | 5 | 6 | 6 | 6 | 7 | 8 | 8 | 9 | 10 | 10 | 10 | 11 | 12 | 13 | 14 | 15 |

TABLE 5

| Synthesis Parameters for Speech of [WA] Extending over 172 ms | | | | | | | | |
|---|---|---|---|---|---|---|---|---|
| Frame | Parameter File | | | | Speech Spoken at Higher Speed | | Parameters for Speech Extending over 172 ms | |
| No. | V/U | $P_i$ | $\Delta P_i$ | $\Delta T_i$ | Frame No. | $q_j$ | $r_i$ | $T_i/T_o$ |
| 1 | V | 350 | 51 | 0 | 1 | 299 | 321.44 | 1.0 |
| 2 | V | 353 | 76 | 0 | 2 | 277 | 310.44 | 1.0 |
| 3 | V | 360 | 129 | 0 | 3 | 231 | 287.76 | 1.0 |
| 4 | V | 373 | 151 | 0 | 4 | 222 | 288.44 | 1.0 |
| 5 | V | 394 | 123 | 0 | 5 | 271 | 325.12 | 1.0 |
| 6 | V | 417 | 55 | 0.67 | 6 | 362 | 386.20 | 0.63 |
| 7 | V | 466 | 104 | 0.67 | 6 | 362 | 407.76 | 0.63 |
| 8 | V | 537 | 175 | 0.67 | 6 | 362 | 439.00 | 0.63 |
| 9 | V | 578 | 54 | 0 | 7 | 524 | 547.76 | 1.0 |
| 10 | V | 601 | 59 | 0.50 | 8 | 542 | 567.96 | 0.72 |
| 11 | V | 621 | 79 | 0.50 | 8 | 542 | 576.76 | 0.72 |
| 12 | V | 642 | 53 | 0 | 9 | 589 | 612.32 | 1.0 |
| 13 | V | 668 | 19 | 0.67 | 10 | 649 | 657.36 | 0.63 |
| 14 | V | 701 | 52 | 0.67 | 10 | 649 | 671.88 | 0.63 |
| 15 | V | 727 | 78 | 0.67 | 10 | 649 | 683.32 | 0.63 |
| 16 | V | 737 | 52 | 0 | 11 | 685 | 707.88 | 1.0 |
| 17 | V | 757 | 31 | 0 | 12 | 726 | 739.64 | 1.0 |
| 18 | V | 766 | 29 | 0 | 13 | 737 | 749.76 | 1.0 |
| 19 | V | 738 | 32 | 0 | 14 | 706 | 720.08 | 1.0 |
| 20 | V | 759 | 24 | 0 | 15 | 735 | 745.56 | 1.0 |
| Total | — | — | — | 5.0 | — | — | — | 17.2 |

In Table 5, $p_i$, $\Delta p_i$, $q_j$, and $r_i$ are shown only as to the first parameters.

Figure 9:
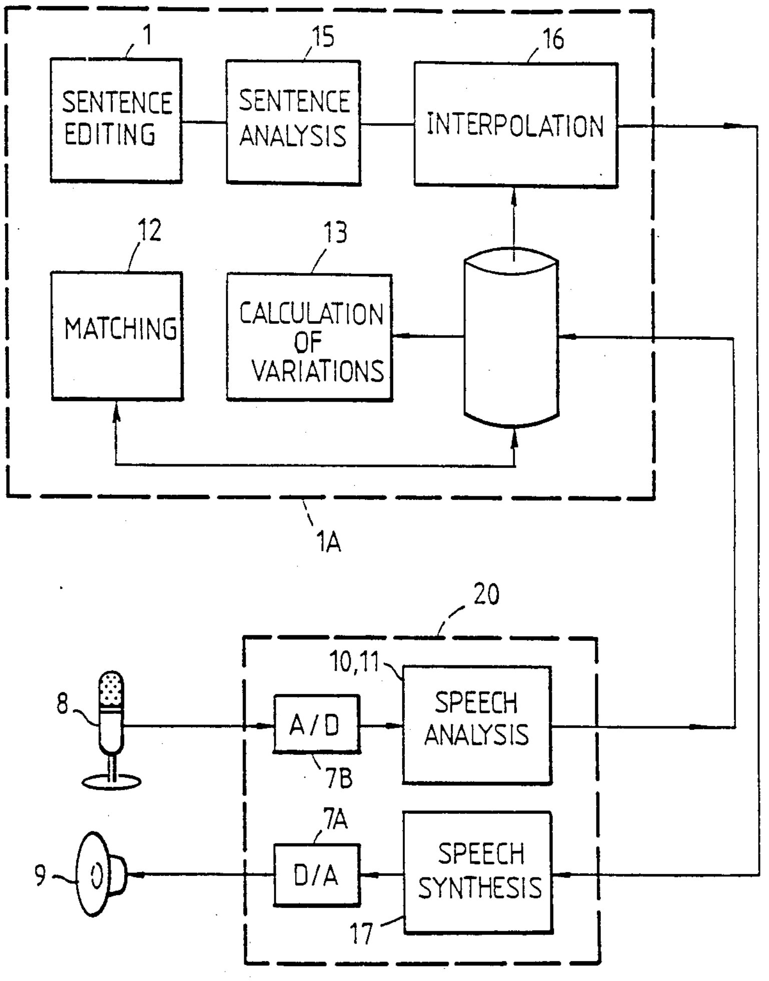
FIG. 9 shows a block diagram illustrating another convenient system which may be replaced for the system in FIG. 1.

While the present embodiment has been explained above with respect to an example employing the system illustrated in FIG. 1, it is of course possible to realize the present invention with a small system by employing a signal processing board 20 as illustrated in FIG. 9. In the example illustrated in FIG. 9, a workstation 1A performs the functions of editing a sentence, analyzing the sentence, calculating variations, interpolatio, etc. In FIG. 9, the portions having the functions equivalent to those illustrated in FIG. 1 are illustrated with the same reference numbers. The detailed explanation of this example is omitted here.

Next, two modifications of the above-stated embodiment will be explained.

Figure 10:
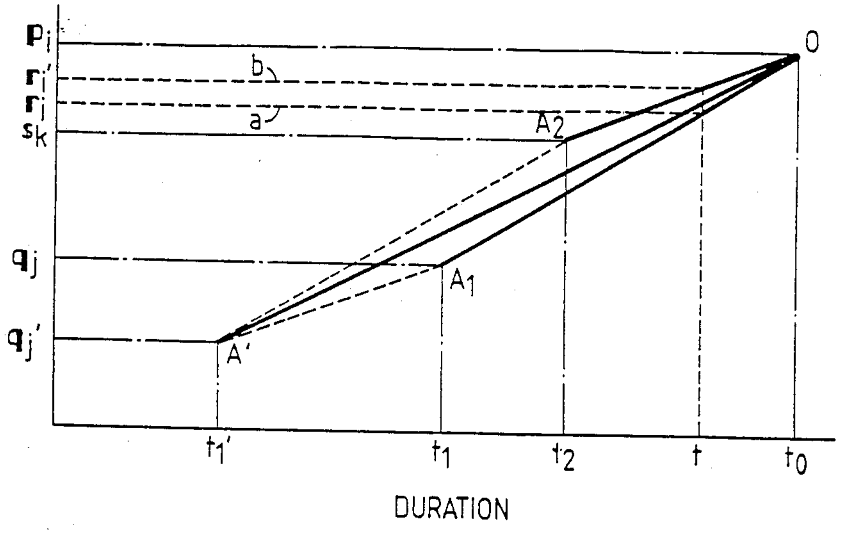
FIG. 10 shows a diagram for explaining a modification of the first embodiment.

In one of the modifications, training of the parameter file is discussed. It is noted that errors occur when such training is not performed. FIG. 10 illustrates the relations between synthesis parameters and durations. In FIG. 10, to generate the synthesis parameters $r_i$ from the parameters $p_i$ for the speech spoken at the lower speed and the parameters $q_j$ for the speech spoken at the higher speed, interpolation is performed by using a line $OA_1$, as shown with a broken line (a). Similarly, to generate synthesis parameters $r_i'$ from (i) parameters $s_k$ for another speech spoken at another higher speed (extending over a duration $t_2$) and the (ii) parameters $p_i$, interpolation is performed by using a line $OA_2$, as shown with a broken line (b). Apparently, the synthesis parameters $r_i$ and $r_i'$ are different from each other. This is due to the errors, etc., caused in matching by the DP matching.

In this modification, the synthesis parameters $r_i$ are now generated by using a line OA' which is obtained by averaging the lines $OA_1$ and $OA_2$, so that there would be a high probability that the errors of the lines $OA_1$ and $OA_2$ would be offset by each other, (e.g. by adding line $OA_1$ to line $OA_2$) as seen from FIG. 10. According to FIG. 10, it is observed that $t_1$ is replaced by $t_1'$, $q_j$ is replaced by $q_j'$, and a new $r_i$ is set along line OA' at time t. Although the training is performed once in the example shown in FIG. 10, it is obvious that additional training would result in smaller errors, as in this modification.

Figure 11:
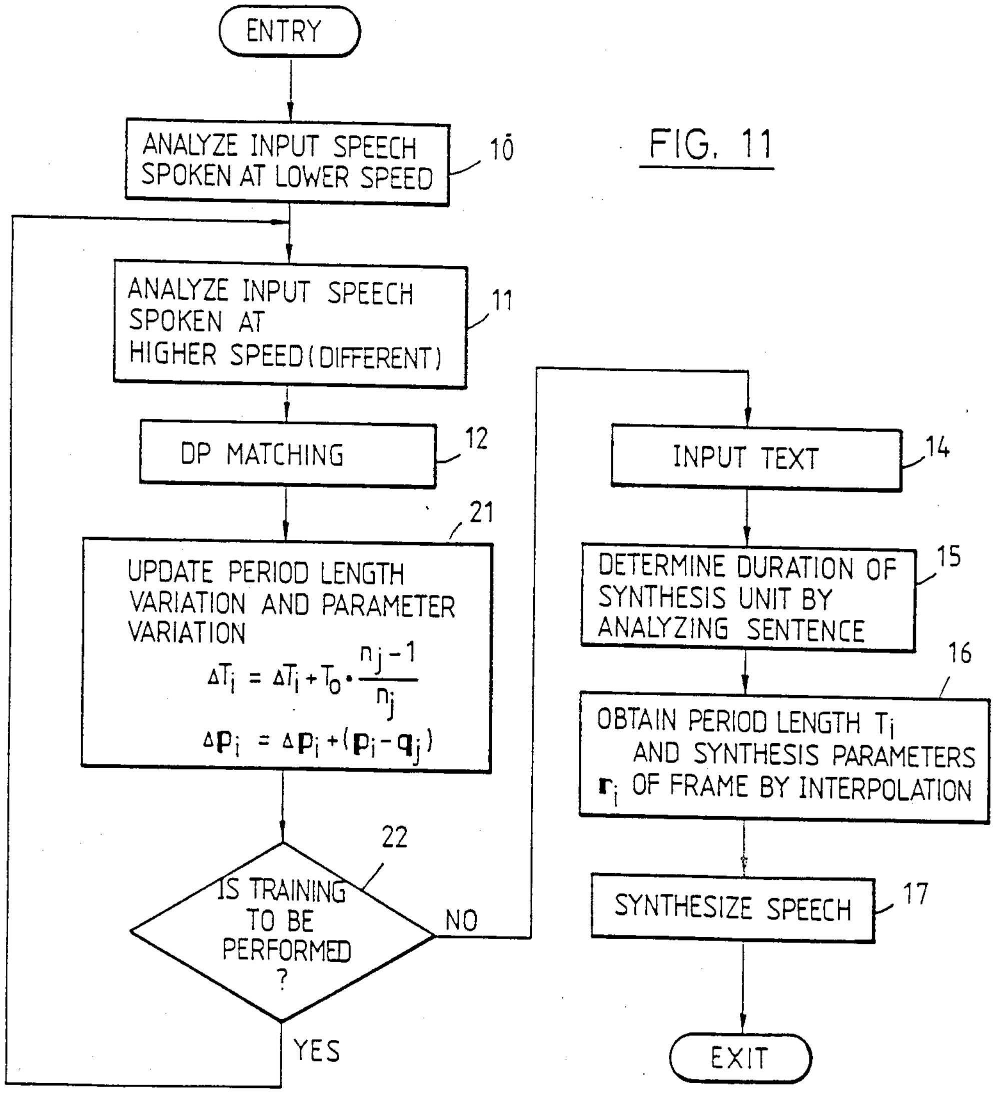
FIG. 11 shows a flow chart for explaining the processing performed in the modification.

FIG. 11 illustrates the procedures in this modification, with portions similar to those in FIG. 2 illustrated with similar numbers. Similar steps are not explained here in detail.

In FIG. 11, the parameter file is updated in Step 21, and the necessity of training is judged in Step 22 so that the Steps 11, 12, and 21 would be repeated when needed.

Although, in Step 21, $\Delta T_i$ *'l and* $\Delta_{pi}$ are obtained according to the following expressions, $$\Delta T_i = \Delta T_i + \left(\frac{n_j - 1}{n_j}\right) T_0$$

$$\Delta p_i = \Delta p_i + (p_i - q_j)$$

it is obvious that a processing similar to the Steps in FIG. 2 is performed since $\Delta T_i = 0$ and $\Delta p_i = 0$ in the initial stage. When the values after a training corresponding to those before a training $$(t_1 - t_0),\ (p_i - q_j),\ \text{and}\ \left(\frac{n_j - 1}{n_j}\right)$$

are denoted, respectively, with apostrophes attached thereto, as $$(t_1 - t_0)',\ (p_i - q_j)',\ \text{and}\ \left(\frac{n_j - 1}{n_j}\right)',$$

the following expressions are obtained (See FIG. 10).

$$(t_1 - t_0)' = t_1' - t_0 = (t_1 - t_0) + (t_2 - t_0)$$

$$(p_i - q_j)' = p_i - q_j' = (p_i - q_j) + (p_i - s_k)$$

-continued $$\left(\frac{n_j-1}{n_j}\right)' = \frac{n_j-1}{n_j} + \frac{n_k-1}{n_k}$$

Accordingly, when the values after the training correspond to those before the training, $\Delta p_i$ and $\Delta T_i$, are denoted as $\Delta p_i'$ and $\Delta T_i'$, respectively, the following expressions are obtained.

$$\Delta p_i' = (p_i - q_j)' = \Delta p_i + (p_i - s_k)$$

$$\Delta T_i' = T_0\left(\frac{n_j-1}{n_j}\right) = \Delta T_i + T_0\left(\frac{n_k-1}{n_k}\right)$$

Further, when an interpolation variable after the training is denoted as x', the following expressions are obtained.

$$x' = \frac{t-t_0}{(t_1-t_0)'} = \frac{t-t_0}{(t_1-t_0)+(t_2-t_0)}$$

or $$\frac{1'}{x'} = \frac{(t_1-t_0)+(t_2-t_0)}{t-t_0} = \frac{1}{x} + \frac{t_2-t_0}{t-t_0}$$

In Step 21 in FIG. 11, apostrophe's are omitted, and k and s are replaced with j and q, respectively.

With regard to the othe modification, it is noted that, in the above-stated basic embodiment, the parameters obtained by analyzing the speech spoken at the lower speed are used as the origin for interpolation. Therefore, a speech to be synthesized at a speaking speed near that of the speech spoken at the lower speed would be of high quality since parameters near the origin.

For interpolation can be employed. On the other hand, the higher the speaking speed of a speech to be synthesized is, the more the quality would be deteriorated. For improving the quality of a synthesized speech parameters obtained by analyzing a speech spoken at such a speed as is used most frequently (this speed is hereinafter referred to as "a standard speed") are used as the origin for interpolation. Accordingly, when a speech is at a speaking speed higher than the standard speed, is to be synthesized, the abovestated embodiment itself may be applied thereto by employing the parameters obtained by analyzing the speech spoken at the standard speed as the origin for interpolation.

Figure 12:
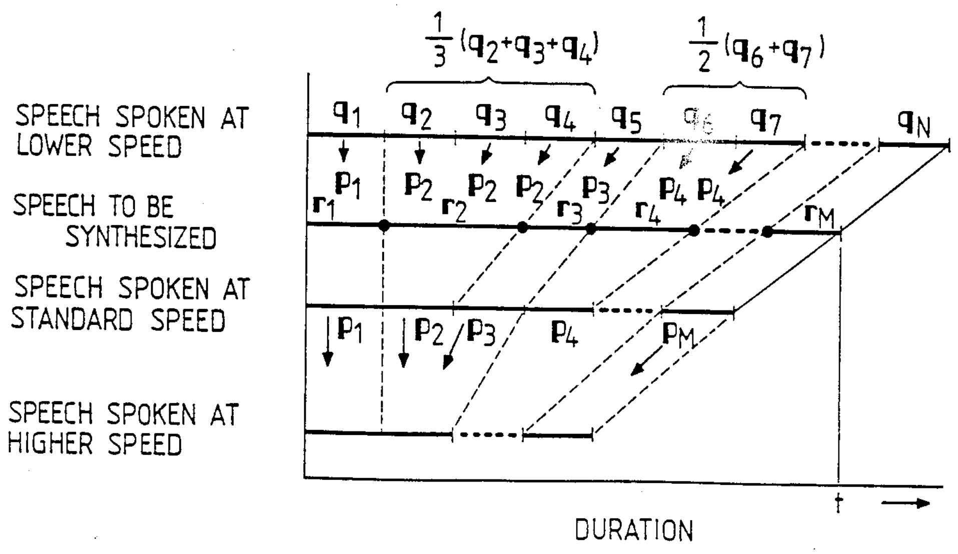
FIG. 12 shows a diagram illustrating another modification of the first embodiment.

On the other hand, in synthesizing a speech at a speaking speed lower than the standard speed, a plurality of frames in the speech spoken at the lower speed may correspond to one frame in the speech spoken at the standard speed, as illustrated in FIG. 12, and in such a case, the average of the parameters of the plurality of frames is employed as the end for interpolation on the side of the speech spoken at the lower speed.

More specifically, when the duration of the speech spoken at the standard speed is denoted as $t_0$ ( $t_0 = MT_0$ ) and the duration of the speech spoken at the lower speed is denoted as $t_1$ ( $t_1 = NT_0$, $N > M$), the parameters of each of the M frames in the speech to be synthesized, extending over the duration t ($t_0 \leqq t \leqq t_1$), is obtained. (See FIG. 12.) When $t = t_0 + x(t_1 - t_0)$, the duration $T_i$ and the synthesis parameters $r_i$ of the "i"th frame are respectively expressed as $$T_i = T_0 + xT_0(n_i - 1)$$

$$r_i = p_i - x\left(p_i - \frac{1}{n_i}\sum_{j \in J_i} q_j\right)$$

where $p_i$ denotes the parameters of the "i"th frame in the speech spoken at the standard speed, $q_j$ denotes the parameters of the "j"th frame in the speech spoken at the lower speed, $J_i$ denotes a set of the frames in the speech spoken at the lower speed corresponding to the "i" th frame in the speech spoken at the standard speed, and $n_i$ denotes the number of elements of $J_i$.

Thus, by determining uniquely the parameters of each of the frames in the speech spoken at the lower speed, corresponding to each of the frames in the speech spoken at the standard speed, in accordance with the expression.

$$\frac{1}{n_i}\sum_{j \in J_i} q_j,$$

it is possible to determine the parameters for a speech to be synthesized at a lower speed than the standard speed by interpolation. Of course, it is also possible to perform the trainings of the parameters in this case.

As explained above, the present invention obtains a synthesized speech extending over a variable duration by interpolating the synthesis parameters obtained by analyzing speeches spoken at different speeds. The processing of the interpolation is convenient and can add the characteristics of the original synthesis parameters. Therefore, according to the present invention, it is possible to obtain a synthesized speech extending over a variable duration conveniently without deteriorating the phonetic characteristics. Further, since training is possbile, the quality of the synthesized speech can be further improved as required. The present invention can be applied to any language. The parameter file may be provided as a package.

Having thus described my invention, what I claim as new, and desire to secure by Letters Patent is:

1. A speech synthesis process comprising the steps of:

(a) generating, for each of synthesis units for speech synthesis, a plurality of first data portions, each having a fixed period length, from a first speech data representing each of said synthesis units;

(b) generating, for each of said synthesis units, the same number of second data portions as that of said first data portions, each of said second data portions corresponding acoustically to each of said first data portions, from at least one second speech data representing each of said synthesis units, said second speech data extending over a duration different from that of said first speech data;

(c) determining a synthesis unit to be synthesized;

(d) determining a target duration of said determined synthesis unit;

(e) determining a period length of each of a series of synthesis frames, said series of synthesis frames extending over said determined target duration of said determined synthesis unit and comprising the same number of frames as that of said first data portions, by interpolation based on said determined target duration of said determined synthesis unit, with reference to each of period lengths of said first and second data portions for said determined synthesis unit, each of said first and second data portions corresponding to each of said synthesis frames;

(f) determining synthesis parameters to each of said synthesis frames, by interpolation based on said determined target duration of said determined synthesis unit, with reference to each of synthesis parameters of said first and second data portions for said determined synthesis unit, each of said first and second data portions corresponding to each of said synthesis frames; and (g) synthesizing a speech based on said determined period length and synthesis parameters of each of said synthesis frames.

2. A speech synthesis process as described in claim 1, wherein:

one second speech data is employed in said Step (b); and said Step (b) comprises the sub-steps of;

generating a plurality of third data portions, each having a fixed period length, from said second speech data;

matching said third data portions with said first data portions based on their acoustic characteristics; and dividing said second speech data into said second data portions based on said matching.

3. A speech synthesis process as described in claim 1, wherein:

more than one second speech data is employed in said Step (b); and said Step (b) comprises the sub-steps of;

generating a plurality of third data portions, each having a fixed period length, from each of said more than one second speech data;

matching said third data portions with said first data poritons, for each of said more than one second speech data, based on their acoustic characteristics;

dividing one of said more than one second speech data into said second data portions based on said matching for one of said more than one second speech data; and correcting said period length and synthesis parameters of each of said second data portions based on said matching for the other or each of the others of said more than one second speech data.

4. A speech synthesis process as described in claim 1, wherein;

said fixed period length is a period length of an analysis frame.

5. A speech synthesis process as described in claim 2, wherein;

said sub-step of matching is performed based on a dynamic programming.

6. A speech synthesis process as described in claim 1, wherein;

said duration of said first speech data is a standard speaking period according to said determined synthesis unit.

7. A speech synthesis system comprising:

(a) storage means for storing a first data and a second data generated for each of synthesis units for speech synthesis parameters of each of a plurality of first data portions, each having a fixed period length, generated from a first speech data representing each of said synthesis units, and said second data representing a period length and synthesis parameters of each of the same number of second data portions as that of said first data portions, each of said second data portions corresponding acoustically to each of said first data portions, generated from at least one second speech data representating each of said synthesis units, said second speech data extending over a duration different from that of said first speech data;

(b) means for determining a synthesis unit to be synthesized;

(c) means for determining a target duration of said determined synthesis unit;

(d) means for determining a period length of each of a series of synthesis frames, said series of synthesis frames extending over said determined target duration of said determined synthesis unit and comprising the same number of frames as that of said first data portions, by interpolation based on said determined target duration of said determined synthesis unit, with reference to said first and second data stored in said storage means;

(e) means for determining synthesis parameters of each of said synthesis frames, by interpolation based on said determined target duration of said determined synthesis unit, with reference to said first and second data stored in said storage means; and (f) means for synthesizing a speech based on said determined period length and synthesis parameters of each of said synthesis frames.

8. In speech snythesis wherein words are characterized as sequences of synthesis units, a method of synthesizing speech for a synthesis unit based on a plurality of utterances thereof, the method comprising the steps of:

generating a first series of M frames of analysis data, one frame every To period, in rsponse to a low-speed utterance of the synthesis unit, each frame having a parameter value corresponding thereto;

generating a second series of N frames of analysis data, one frame every To period, in response to a high-speed utterance of the synthesis unit, each frame having a parameter value corresponding thereto;

segmenting some of the To periods of the second series into divided data portions, the undivided To periods and the data portions forming M data intervals for the high-speed utterance, the To periods of the first series matching, one-by-one, the data intervals of the second series;

interpolating the time length of each ith interval ($1 \leq i \leq M$) of synthesized data for the synthesis unit to be bound by (i) To and (ii) the time length of the ith data interval of the high-speed utterance; and interpolating the parameter value of each ith frame of synthesized data for the synthesis unit to be bound by (i) the parameter value of the ith frame of the first series and (ii) the parameter value of the ith data interval of the second series.

9. The method of claim 8 wherein the time interval interpolation includes the step of:

calculating an interpolation variable x which indicates conformity between the time lengths corresponding to the synthesized data and time lengths corresponding to either the low-speed utterance or the high-speed utterance.

10. The method of claim 9 comprising the further step of:

calculating the time length of each frame Ti of the synthesized data as:

$$Ti = To - x\ \Delta Ti$$

where ΔTi is the difference in length between the period length of the ith frame in the first series and the time length for the ith time interval of the high-speed utterance.

11. The method of claim 10 wherein the parameter interpolating step includes the step of:

calculating a parameter value ri for the ith time interval of the synthesized data as:

$$= -\Delta ri = pi\text{-}x\ \Delta pi$$

where pi is the parameter value of the ith frame in the first series and Δpi is the difference in value between (i) pi and (ii) the parameter value for the ith time interval corresponding to the high-speed utterance.

12. In speech synthesis wherein words are characterized as sequences of synthesis units, a method of synthesizing speech for a synthesis unit based on a plurality of utterances thereof at differing speeds, the method comprising the steps of:

generating, for each utterance of the synthesis unit, a series of frames of analysis data, the frames being generated one frame every To period, each frame in each series having a parameter value associated therewith;

where one series results in M frames of data, partitioning each other series of frames to provide M time intervals each of which corresponds to one of the frames of said one series;

synthesizing speech data for the synthesis unit, the synthesized speech data corresponding to a sequence of time intervals wherein each time interval has an associated parameter value, said synthesizing step including the steps of:

representing the synthesized data as a sequence of M time intervals, interpolating each ith time interval (where $1 > i > M$) for the synthesized data from the respective ith intervals corresponding to the utterance; and interpolating the parameter value at each ith time interval of the synthesized data from the parameter values for the respective ith intervals corresponding to the utterances.

13. A speech synthesis system comprising:

means for generating first speech data representing a unit of synthesized speech extending over a first time duration, said first time duration being divided into a series of first frame periods having lengths, said first speech data comprising a plurality of first data portions, each first data portion representing the length of a first frame period and a first speech synthesis parameter of the unit of synthesized speech corresponding to the first frame period;

means for generating second speech data representing the unit of synthesized speech extending over a second time duration different from the first time duration, said second time duration being divided into a series of second frame periods having lengths, each second frame period corresponding to a first frame period, said second speech data comprising a plurality of second data portions, each second data portion representing the length of a second frame period and a second speech synthesis parameter of the unit of synthesized speech corresponding to the second frame period;

means for generating third speech data representing the unit of synthesized speech extending over a third time duration different from the first and second time durations, said third time duration being divided into a series of third frame periods having lengths, each third frame period corresponding to a first and a second frame period, said third speech data comprising a plurality of third data portions, each third data portion representing the length of a third frame period and a third speech synthesis parameter of the unit of synthesized speech corresponding to the third frame period, said means for generating the third speech data comprising:

means for calculating the length of each third frame period by interpolating between the lengths of the corresponding first and second frame periods; and means for calculating each third speech synthesis parameter by interpolating between the first and second speech synthesis parameters of the corresponding first and second frame periods; and means for synthesizing speech from the third speech data.

14. A speech synthesis system as claimed in claim 13, characterized in that the first time periods have equal lengths.

15. A speech synthesis system as claimed in claim 14, characterized in that the third time duration is between the first and second time durations.

16. A speech synthesis system as claimed in claim 15, characterized in that the number of first frame periods is equal to the number of second frame periods.

17. A speech synthesis system as claimed in claim 15, characterized in that:

the number of first frame periods is not equal to the number of second frame periods; and means are provided for determining the correspondence between first frame periods and second frame periods, said means determining correspondence by dynamic programming.

18. A speech synthesis method comprising the steps of:

generating first speech data representing a unit of synthesized speech extending over a first time duration, said first time duration being divided into a series of first frame periods having lengths, said first speech data comprising a plurality of first data portions, each first data portion representing the length of a first frame period and a first speech synthesis parameter of the unit of synthesized speech corresponding to the first frame period;

generating second speech data representing the unit of synthesized speech extending over a second time duration different from the first time duration, said second time duration being divided into a series of second frame periods having lengths, each second frame period corresponding to a first frame period, said second speech data comprising a plurality of second data portions, each second data portion representing the length of a second frame period and a second speech synthesis parameter of the unit of synthesized speech corresponding to the second frame period;

generating third speech data representing the unit of synthesized speech extending over a third time duration different from the first and second time durations, said third time duration being divided into a series of third frame period having lengths, each third frame period corresponding to a first and a second frame period, said third period corresponding to a first and second third data portions, each third data portion representing the length of a third frame period and a third speech synthesis parameter of the unit of synthesized speech corresponding to the third frame period, said step of generating the third speech data comprising:

calculating the length of each third frame period by interpolating between the lengths of the corresponding first and second frame periods; and calculating each third speech synthesis parameter by interpolating between the first and second speech synthesis parameters of the corresponding first and second frame periods; and synthesizing speech from the third speech data.

19. A speech synthesis method as claimed in claim 18, characterized in that the first time periods have equal lengths.

20. A speech synthesis method as claimed in claim 19, characterized in that the third time duration is between the first and second time durations.

21. A speech synthesis method as claimed in claim 20, characterized in that the number of first frame periods is equal to the number of second frame periods.

22. A speech synthesis method as claimed in claim 20, characterized in that:

the number of first frame periods is not equal to the number of second frame periods; and further comprising the step of determining the correspondence between first frame periods and second frame periods by dynamic programming.

* * * * *